Nov. 28, 1933.                E. GÖRK                    1,936,787
                          REGULATOR SYSTEM
                        Filed May 2, 1931            2 Sheets-Sheet 1
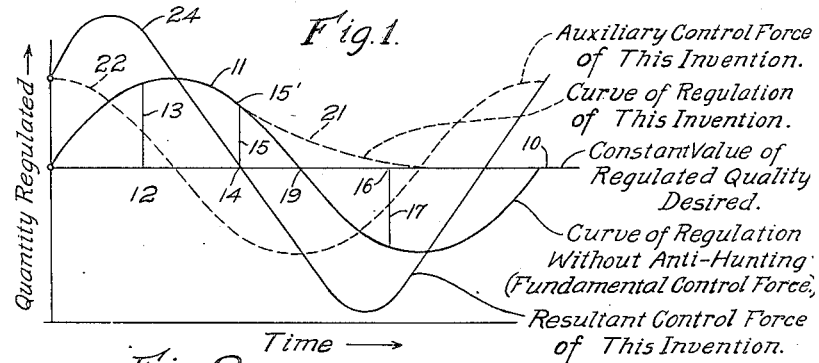
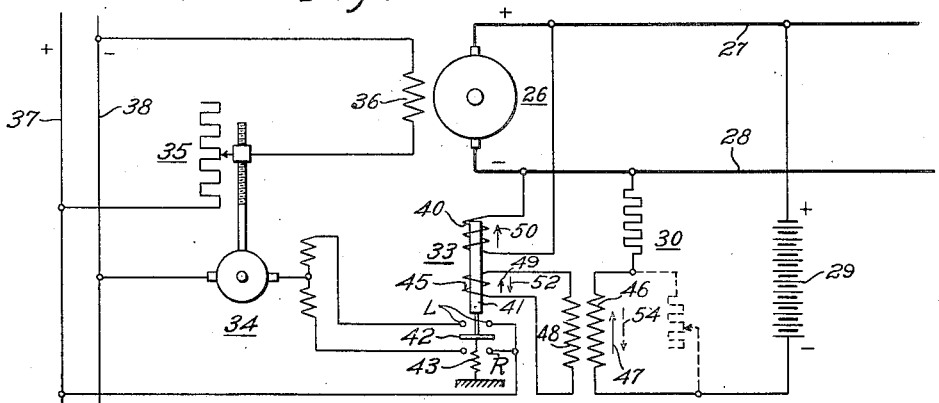
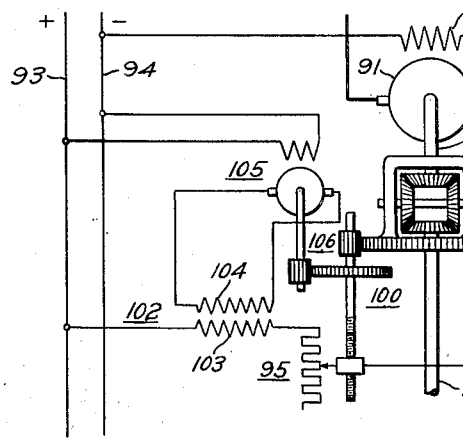
WITNESSES:
INVENTOR
Eugen Görk
BY
ATTORNEY Nov. 28, 1933.   E. GÖRK   1,936,787
REGULATOR SYSTEM
Filed May 2, 1931   2 Sheets-Sheet 2
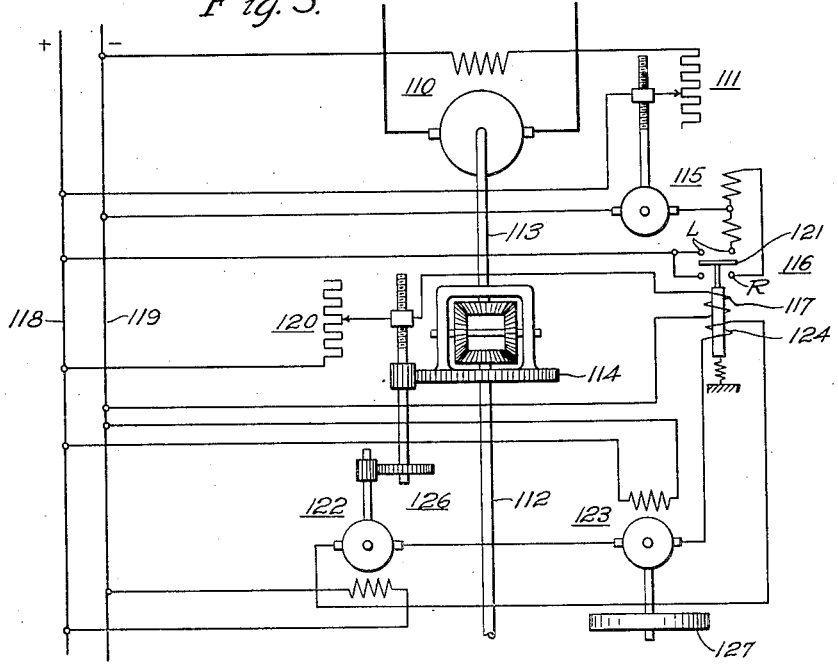
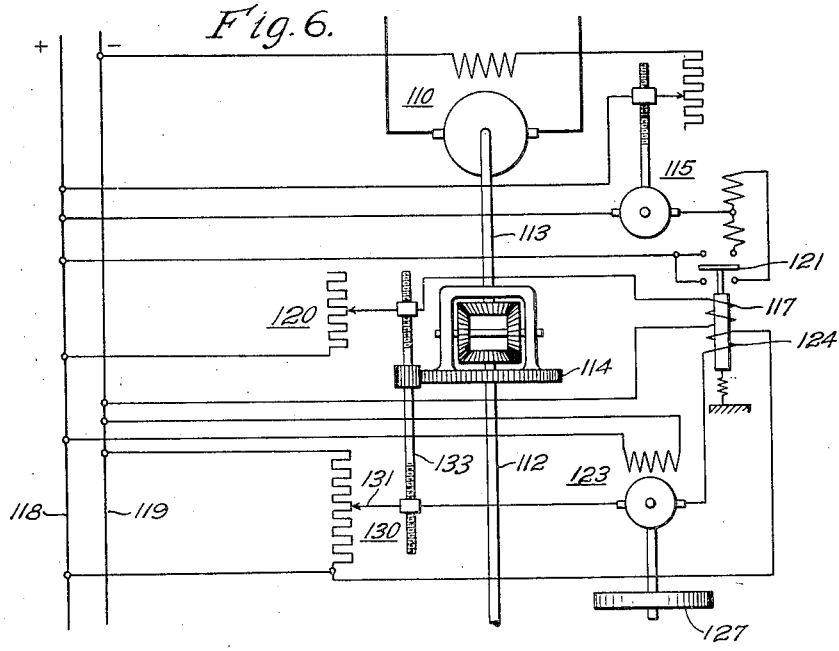
WITNESSES:
INVENTOR
Eugen Görk
BY
ATTORNEY Patented Nov. 28, 1933

1,936,787

UNITED STATES PATENT OFFICE 1,936,787

REGULATOR SYSTEM

Eugen Görk, Berlin-Charlottenburg, Germany, assignor to Westinghouse Electric & Manufacturing Company, a corporation of Pennsylvania Application May 2, 1931, Serial No. 534,571, and in Germany May 3, 1930

3 Claims. (Cl. 171—119)

My invention relates to regulators and has particular relation to means utilized in regulating systems for the purpose of preventing overshooting of the regulator in its corrective action.

In regulating systems, in which it is desired that a quantity be maintained at a given value, it is frequently necessary to utilize some means for damping the regulator in order to prevent "hunting" or overshooting of the corrective action. Such means frequently operate to weaken the corrective impulses of the regulator, thus causing the control to be sluggish, thereby necessitating that the regulator take too long a time to correct for variations in the regulated quantity when it changes from its desired value.

The present invention is directed to a method of overcoming this, as well as other disadvantages, and contemplates the utilization of an auxiliary-control force which is superimposed upon the main or fundamental-control force of the regulator in such manner that this main force is strengthened when the regulated quantity changes in a direction away from the value desired and is weakened when the regulated quantity changes in a direction approaching the desired value.

Generally stated, it is the object of my invention to provide improved means for causing a regulator to have an anti-hunting characteristic.

One object of my invention is to provide, in a regulating system, means for increasing the speed of response of the regulator, to thereby make the corrective operations more rapid and positive.

Another object of my invention is to provide means for preventing hunting in a regulator system, which means additionally functions to increase the effectiveness of the fundamental regulator action.

More specifically stated, it is the object of my invention to provide, in a regulator system, means for preventing overshooting of the corrective action and for aiding the fundamental-corrective force in maintaining the quantity regulated at the desired uniform value.

In practicing my invention, I contemplate the provision of two separate controlling forces for acting upon the regulating means, one of which forces varies directly with the deviation of the regulated quantity from its desired value and the other of which varies in accordance with the rate and direction of change of this quantity from its desired value. The regulator action is thus disproportionally strengthened or magnified when the regulated quantity departs from its desired value and is correspondingly weakened when the regulated quantity approaches its desired value.

My invention together with additional objects and advantages thereof, will best be understood from the following description of specific embodiments, when read in conjunction with the accompanying drawings, in which:

Figure 1 is a diagram of curves illustrating the action of a typical regulating system arranged in accordance with my invention.

Fig. 2 is a diagrammatic view of a voltage regulator of the rheostatic type, applied to a direct-current generator, arranged in accordance with one embodiment of my invention.

Fig. 3 is a diagrammatic view of a vacuum-tube voltage regulator, of one type, also applied to a direct-current generator and arranged in accordance with this invention.

Fig. 4 is a diagrammatic view of my invention applied to a speed-regulating system for a direct-current motor.

Figs. 5 and 6 are diagrammatic views illustrating additional modifications of my invention applied to speed regulators for direct-current motors.

Referring to the drawings, the curves of Fig. 1 illustrate the action of the anti-hunting means of my invention, when utilized in a regulating system. Curve 10 represents the value at which it is desired to maintain the regulated quantity. If this regulated quantity tends to vary from the desired constant value, and a regulator, not provided with anti-hunting means is employed, the quantity would vary in accordance with curve 11.

In regulators of known design, the fundamental-control force impressed upon the change-responsive element is generally proportional to the deviation of the quantity regulated from the desired value or, as shown in Fig. 1, to the amplitude of curve 11 above or below curve 10; that is, a typical regulator will act at point 12 with a quantity-lowering force 13, at point 14 with a lowering force 15, and at point 16 with a quantity-raising force 17.

As the regulator brings about a corrective action to bring the regulated quantity back to its desired value, the fundamental-control force correspondingly decreases. Thus, when the regulated quantity has become equal to its desired value, as at point 19 in Fig. 1, the fundamental control force has decreased to zero. Because of the inertia, mechanical, electrical or otherwise, which the devices, upon which the regulator acts, usually possess, the regulated quantity does not stop at its desired value, at point 19, but continues to decrease somewhat below that value, and the regulator is caused to bring about a corrective action in the opposite direction. It will be recognized that this results in the well known hunting effect.

If the regulating force had been discontinued, as at point 16, the regulated quantity would have been allowed to gradually decrease, according to the broken curve 21, and would have coincided with the desired value in such manner that overshooting would have been avoided.

The auxiliary control force, which I provide in the system of my invention is proportional to the rate of change and direction of the fundamental force, previously shown to be represented by curve 11 and is represented by curve 22 in Fig. 1. The force 22 is combined with this fundamental force to produce a resultant control or regulating force, such as is represented by curve 24, in Fig. 1.

It will be apparent that this auxiliary force is maximum when the quantity regulated is changing at the greatest rate away from the desired value, is zero when the quantity regulated ceases to change, and is maximum in the opposite direction when the quantity regulated is approaching the desired value at the maximum rate. The auxiliary control force, therefore, aids the fundamental one at the beginning of the control operation and causes the maximum deviation of the quantity regulated to be correspondingly reduced. In the second portion of the control cycle, this auxiliary force acts to so decrease the main control force that the quantity regulated will assume the constant value, which is desired, without overshooting.

It will be apparent to those skilled in the art that my invention may be applied to regulators which are disposed to control all kinds of quantities, such as voltages, currents, speeds, or the supply of power input to prime movers, and that it is not limited to the several applications illustrated in the drawings.

One particular form of my invention, as applied to a voltage-regulating system, is shown in Fig. 2, in which the voltage to be controlled is supplied, by a direct-current generator 26, to circuit conductors 27 and 28.

In the system of Fig. 2, a voltage-responsive element 33 is disposed to control the energizing circuit of a motor 34 which adjusts a rheostat 35 to control the excitation of generator-field-winding 36, to thereby regulate the generator voltage. The winding 36 may be energized from any suitable direct-current source, represented by conductors 37 and 38. The voltage responsive relay 33 is provided with a winding 40 that is responsive to the voltage of the generator 26 and acts upon the movable plunger 41 to control the position of the contact segment 42 carried thereon. At the desired value of generator voltage, the contact segment 42 is biased to a position midway between the contact members R and L by the balanced upward pull of winding 40 and the downward pull of the spring 43, in well known manner.

As illustrated, the motor 34 is of the well-known split-field, series type and is disposed for energization from the direct-current-source conductors 37 and 38 through the action of the voltage relay 33. Since specific motor-control circuits form no part of this invention, they are here shown in a simplified form.

As will be evident, an increase in the voltage of the generator 26 causes the control segment 42 to move upwardly into engagement with contact members L, thereby energizing the motor 34 in a manner to cause it to rotate in a voltage-lowering direction. Similarly, a decrease in the value of generator voltage allows the contact segment 42 to move downwardly into engagement with contact members R, to so energize the motor 34 as to cause it to operate in a voltage-raising direction.

To prevent "overshooting" of the voltage-adjusting action, I provide an auxiliary control winding 45 to act upon the movable plunger 41 of the regulator element 33 to modify the action of the main control winding 40.

A battery 29, or other suitable source of constant potential, is utilized in the system of Fig. 2 to provide a constant voltage of a value equivalent to the desired potential at which the regulating system is disposed to maintain generator 26. It will be observed that the battery 29 is connected to generator conductors 27 and 28 in polarity opposition, through one winding of a transformer 31, and a suitable resistance 30, or other sensitivity adjusting device.

In order that auxiliary-control winding 45 may be energized in proportion to the rate of change of the generator voltage from the desired value, transformer 31, already mentioned, is disposed in the system in the manner shown, winding 46 being connected in circuit with the standard-voltage battery 29, and generator conductors 27 and 28, and the secondary winding 48 being connected directly to the winding 45.

An increase in the voltage of generator 26, above that of battery 29, causes a current to flow through the transformer-primary winding 46 in a direction indicated by the solid arrow 47, which increasing current induces, in the secondary winding 48, a voltage which energizes control-element winding 45 in the direction indicated by arrow 49, which, it will be observed, is the same direction as the energizing current for the main control winding 40, designated by arrow 50.

Because of the relation of windings 40 and 45, upward movement of control element plunger 41, in response to this increase in voltage, is accordingly made faster, and voltage-control motor 34 is energized sooner than by the action of control winding 40 alone. The corrective action, thus initiated, functions to stop the increase in the generator voltage, and causes it to start to decrease back toward the desired normal value.

This voltage decrease allows the current through the primary winding of transformer 31 to similarly decrease, with the result that the direction of the voltage induced in the secondary winding 40 is reversed. Auxiliary control winding 45 is now energized in the opposite direction, as indicated by arrow 52, and functions to decrease the upward pull exerted by main control winding 40, thus allowing plunger 41 to move downwardly to deenergize motor 34, before the generator voltage has reached the normal value desired. In the curves of Fig. 1, this point corresponds to 15'. The generator voltage is thus allowed to gradually approach the desired value, along some such curve as is indicated at 21 in Fig. 1.

Similarly, a decrease in the generator voltage below the desired value causes a current to flow through the primary winding 46, of the transformer 31, in the direction indicated by arrow 54, which current induces in the secondary winding 48 a voltage which energizes auxiliary-control winding 45 in the direction indicated by arrow 52, thereby accelerating the downward movement of contact segment 42 to cause the voltage-adjusting motor 34 to be energized to operate in a voltage-raising direction sooner than it would under the action of main-control winding 40 alone.

The decrease in generator voltage having been arrested by this corrective action, current through the transformer winding 46 ceases to change in magnitude, and the voltage induced in the secondary winding 48 falls to zero, under this condition. As the generator voltage raises to approach the desired value, the current magnitude through the primary winding of transformer 31 is decreased, and thus there is induced, in the secondary winding, a voltage which energizes auxiliary-control winding 45 in the direction indicated by arrow 49. Contact 42 is thereby caused to move upwardly to deenergize motor 34 before the generator voltage has been completely brought back to the desired value.

Thus, it will be seen that, through the arrangement shown, the auxiliary control force exerted on the regulator element 33, by the winding 45, varies in a manner comparable to that shown by curve 22 in Fig. 1, when the generator voltage changes in the manner indicated by curve 11 of the same figure, which curve, as has been pointed out, is also a measure of the main control force exerted by control winding 40. It will be apparent, therefore, that the resultant control force, exerted on movable member 41 of the regulator element 33, varies in accordance with curve 24 of Fig. 1, when the main and auxiliary control forces change in accordance with curves 11 and 22, respectively.

It is evident that, in the system of Fig. 2, the effect of the auxiliary control force, supplementing as it does the action of the fundamental control force, is such that it produces initiation of voltage-corrective actions sooner than would otherwise be possible, and, in addition, acts to prevent overshooting of these corrective actions.

In Fig. 3, I have shown my invention embodied in a voltage regulator of the vacuum-tube type, which regulator is illustrated in a simplified form. A direct-current generator 58 supplies voltage to circuit conductors 59 and 60 which, in order to be regulated, is compared with that of a standard-voltage battery 61, in a well-known manner, the difference between these two voltages being impressed upon the grid element 62 of the vacuum tube 63. It will be understood that, in a regulator of the type shown in Fig. 3, the normal or desired voltage of generator 58 is of the same magnitude as that of battery 61.

Since the anti-hunting problem is most pronounced for generators with which separate exciters are used, I have shown, in Fig. 3, an exciting generator 65 which is disposed to supply current to the main generator-field winding 66. In circuit with the exciter-field winding 64, the vacuum tube 63 is disposed in the manner shown, so that an energizing circuit for the winding is established from positive conductor 69 of a direct-current source through winding 64, plate 70 of vacuum tube 63, filament 68 of the tube and conductor 71, back to negative conductor 72 of the direct-current source. Tube filament 68 may be energized in any suitable manner, such as from alternating-current circuit conductors 73 and 74, through a transformer 75.

Battery 61 is so connected in opposition to generator 58 that the grid 62 of the vacuum tube 63 is maintained at substantially zero potential with respect to filament 68 when the voltage of the generator 58 is at the normal value desired. For this condition, the plate-to-filament resistance of the tube is of such value as to allow sufficient current to flow through the exciter field winding 64 to produce the normal value of voltage desired in the generator 58.

An increase in the generator voltage above that of battery 61 impresses upon the vacuum tube grid 62 a potential which is negative with respect to that of filament 68. The flow of electrons from filament to plate is accordingly retarded, and the effective tube resistance is increased so that the exciter field current is lowered and the voltage of generator 58 is likewise reduced.

Similarly, a decrease in the generator voltage impresses upon grid 62 a potential which is positive with respect to that of filament 68, the exciter field current is raised, and the generator voltage is thereby increased.

Because of the time delay which is inherently present between the change in the exciter-field current and the corresponding change in the generator voltage, there is a marked tendency for a regulating system to overshoot in its corrective action. To eliminate this tendency, I provide a transformer 77, connected in the manner shown, to modify the voltage impressed upon the grid of the vacuum tube in response to the rate and direction of change of the voltage of generator 58. As illustrated, the primary winding 78 of this transformer is connected to be energized by the difference between the generator voltage and that of the standard battery 61, while the secondary winding 79 is disposed in the grid circuit in series with the usual grid resistor 80.

In operation, an increase in generator voltage above that of the standard battery 61 gives generator conductor 60 a lower negative potential than that of battery conductor 82, thus causing a current to flow through transformer winding 78 in the direction indicated by the arrow. The rising value of this current induces in the secondary winding 79, a voltage which adds to the value of the negative potential impressed upon grid 62, by virtue of the potential difference between conductors 60 and 82 already mentioned. As a result, the current flowing through exciter field winding 64 is reduced at a correspondingly higher rate.

When the corrective action, thus initiated, has stopped the increase of the voltage of generator 58, current through the transformer winding 78 ceases to change in magnitude, and the voltage induced in winding 79 drops to zero. As the generator voltage is brought back in a decreasing direction towards the value desired, the current flow through transformer winding 78 correspondingly decreases, and the direction of voltage induced in winding 79 is reversed, from that of the original condition, so that it subtracts from the voltage, between conductors 60 and 82, impressed upon vacuum grid 62 and, as a result, the decrease of exciter field current is prematurely arrested. Thus, the corrective action is slowed down before the generator voltage has actually reached the value desired, and, consequently, the overshooting tendency is effectively eliminated.

In similar manner, it will be seen that a decrease of the generator voltage below the value desired, acts through the transformer 77 to increase the rate at which the current through exciter field winding 64 is increased during the time that the generator voltage is changing in a direction away from the desired value, and as the desired value is again approached, transformer 77 similarly functions to artificially retard the corrective action.

It will be understood that the vacuum-tube regulator illustrated in Fig. 3 is represented only in such detail as is necessary to explain the operation of my invention and that the more elaborate and highly sensitive regulators now known in the art may likewise utilize the anti-hunting means of this invention with equal success.

Fig. 4 illustrates an application of my invention to a regulating system for controlling the speed of a direct-current motor. The armature of the regulated motor is illustrated at 91 and is disposed to be energized by some suitable source of power (not shown). The speed of the motor is adjusted by changing the current which energizes the field winding 92 from any suitable source, such as direct-current circuit conductors 93 and 94, the value of the current being determined by the adjustment of a rheostat 95.

The regulator of Fig. 4 is of the well-known type in which the speed of the regulated machine is compared with that of some standard-speed device. The shaft of such device is represented at 96. A differential mechanism 97 is utilized to provide means for detecting any difference between the speed of the motor armature 91, communicated to the differential through the shaft 98, and the speed of shaft 96. It will be understood that shafts 96 and 98 rotate in opposite directions and that, when their speeds are exactly matched, there is no movement of the differential housing gear 99, likewise that a rise in the speed of the motor shaft 98 with respect to the shaft 96, causes the differential housing gear 99 to rotate in one direction, while a decrease in speed of this shaft causes gear 99 to rotate in the opposite direction.

Coupled with the differential gear 99 is the operating mechanism 100 of the motor-field-current-adjusting rheostat 95. This mechanism is so disposed that a decrease in the speed of the regulated motor operates the rheostat 95 to lower the current through motor-field winding 92 and thereby cause the motor to run faster, and an increase in motor speed increases the current through field winding 92 to cause the motor to run slower.

Because of the time lag between the adjustment of rheostat 95 and the final change in motor-excitation current, that portion of the system of Fig. 4 thus far described possesses an inherent tendency to overshoot in its corrective action. To eliminate this tendency, I insert in the field-winding circuit, of the regulated motor, a transformer 102, the secondary winding 103 of which carries the motor-exciting current, and the primary winding 104 of which is energized by a direct-current generator 105. which is driven by housing gear 99, of the differential mechanism, through a suitable coupling mechanism represented at 106. The field winding of generator 105 is constantly energized, as from conductors 93 and 94.

In the operation of the anti-hunting means, a decrease in the speed of the regulated motor acts through the differential mechanism to drive the generator 105 in such direction that winding 104 of the transformer 102 is energized in a manner to cause a voltage to be induced in the secondary winding 103 which subtracts from that supplied to motor field winding 92, from the direct-current conductors 93 and 94. In this manner, the current through the motor field winding 92 is artificially reduced at a greater rate than under the action of the rheostat 95 alone.

The corrective action having taken effect, the motor speed is caused to approach the desired value, and the speed of rotation of the generator 105 is accordingly reduced. The current flow through the transformer primary winding 104 likewise decreases, and, in so doing, induces, in the secondary winding 103, a voltage which adds to that supplied to motor field winding 92 by direct-current conductors 93 and 94, and the corrective action is accordingly retarded, in such manner that overshooting is prevented.

Similarly, it will be apparent that an increase in the speed of the regulated motor acts to cause the transformer 102 to artificially increase the rate at which the exciting current in the motor-field winding 92 is increased, during the period in which the speed is changing from the desired value, and, as the desired value is being approached, the transformer 102 supplies a voltage which acts to retard the rate at which the motor-exciting current is further increased, thus preventing overshooting of the corrective action.

In place of the transformer 102, which provides an auxiliary regulating force proportional to the rate of change of the fundamental control force, it is possible to utilize means involving mechanical devices for the same purpose.

In Fig. 5 I have shown a speed-regulator system of this character. The motor to be controlled is designated at 110 and, as in the system represented in Fig. 4, is of the direct-current type disposed for energization from any suitable source of power (not shown), adjustment of the speed being effected by means of a suitable excitation-control rheostat 111.

As in the system represented in Fig. 4, the regulating system illustrated in Fig. 5, utilizes a standard-speed device, represented by the shaft 112, with which the speed of the motor shaft 113 is compared, any difference in speed being transmitted to differential-housing gear 114.

The adjustment of the rheostat 111, in response to the speed deviations of the regulated machine, is effected through a suitable motor 115, energized in accordance with the actuation of a regulator element 116. It will be observed that the element 116 is similar to the element 33, shown and described in connection with the regulating system of Fig. 2. The main control winding 117 thereof, is normally energized from direct-current conductors 118 and 119 through a rheostat 120, the setting of which is changed in accordance with movement of differential-housing gear 114.

Thus, increase in the speed of motor shaft 113 above that of shaft 112 adjusts the rheostat 120 in a manner to increase the current through winding 117 to move the control element contact 121 upwardly, thereby energizing the speed-adjusting motor 115 to operate in the speed-lowering direction. Similarly, a decrease in the speed of motor shaft 113 adjusts the rheostat 120 in a direction to decrease the energization of winding 117, thereby allowing control-element contact 121 to move downwardly, and energize the speed-adjusting motor 115 to operate in the speed-raising direction.

For reasons already made evident, a speed-regulating system of this type has a tendency to hunt and overshoot in its corrective action. To provide anti-hunting means, I utilize two auxiliary direct-current dynamo machines, 122 and 123, in combination with auxiliary winding 124 of control element 116, which is disposed to act together with the main control winding 117. It will be observed that the armatures of the auxiliary machines 122 and 123 and control winding 124 are all connected in a closed series circuit. The machine 122, which functions as a generator, is coupled with the differential housing gear 114 by a suitable gear mechanism 126. Machine 123 is provided with a fly-wheel 127, of suitable dimensions, which functions to make changes in the speed of the armature of this machine gradual and relatively slow. The field windings of both machines are constantly energized, as from conductors 118 and 119.

In the operation of the anti-hunting means shown in the regulating system of Fig. 5, a decrease in the speed of motor shaft 113 below that of constant-speed shaft 112 causes the differential gear 114 to rotate and thereby drive the generator 122, causing a voltage to be generated therein. This voltage acts to energize motor 123 and auxiliary-control winding 124, by sending a current through both of these devices. The direction of this current through winding 124 is such that, for the given condition, it opposes the main-control winding 117, in maintaining control-device contact 121 in the neutral position shown, thus allowing this contact to move downwardly, to energize speed-adjusting motor 115 in a speed-raising direction. The effect, therefore, is to cause this corrective action to be initiated sooner than would have been possible under the action of control-winding 124 alone.

In the meantime, machine 123 has been caused to rotate, acting as a motor, by the current flowing through its armature winding from generator 122, and, due to the action of fly-wheel 127, once in rotation, it tends to maintain its speed even though the energizing current may be decreased or removed. The correction of the speed-adjusting action having arrested the decrease in speed of motor 110, and caused it to start to increase toward the normal value desired, the rate of rotation of differential housing gear 114 starts to slow down, and the voltage generated in machine 122 accordingly reduces.

As a result, the current through the auxiliary-control winding 124 reverses, since fly-wheel 127 maintains the speed of machine 123, causing it to act as a generator to reverse the direction of the effective voltage in the series circuit which includes winding 124.

The reversal of this voltage, which energizes winding 124, causes control device 116 to deenergize speed-adjusting motor 115 prematurely, and to thereby arrest the corrective action before the speed of motor shaft 113 has again reached that of standard-speed shaft 112.

It will be apparent that a rise in the speed of motor shaft 113, above that of standard-speed shaft 112, produces a similar action, as regards the anti-hunting means, except that generator 122 is driven in the opposite direction, and auxiliary control winding 124 is, therefore, energized in the opposite direction to assist main-control winding 117 in actuating contact 121 upwardly, from the neutral position shown, so that speed-adjusting motor 115 is energized in the speed-lowering direction sooner than would have been possible under the action of winding 117 alone.

As in the preceding case, machine 123 is caused to rotate by the current forced through its armature. The corrective action having arrested the rise in speed of motor 110, and started to lower it toward that of the standard-speed device, the speed of generator 122 is correspondingly reduced, and, as a result, machine 123 now acts as a generator, it being driven by fly-wheel 127, to send a current through the series circuit, including winding 124, in the reverse direction, thereby causing winding 124 to oppose winding 117 in its upward pull on the movable element of control device 116, to hasten the deenergizing of speed-adjusting motor 115.

The modification of my invention illustrated in Fig. 6 is similar to the basic system shown and described in connection with Fig. 5, except that in place of generator 122, I have substituted a potentiometer or voltage-dividing device 130. Since this substitution constitutes the only difference between the two systems, a repetition of the description of regulator operation is deemed unnecessary except insofar as the substitution mentioned affects it.

In the system of Fig. 6, a balanced condition in the speed of motor shaft 113, with that of constant-speed shaft 112, allows differential housing gear 114 to remain stationary, and for this condition, a movable contact 131 of potentiometer 130 is at some intermediate position, as illustrated, so that an intermediate value of voltage, supplied from direct-current-source conductors 118 and 119, is impressed upon the circuit which includes the direct-current machine 123 and the auxiliary-control winding 124. The machine 123 thus normally acts as a motor and rotates at a speed which is determined by the magnitude of the voltage impressed upon its armature, the current which it draws, and which passes through the winding 124, being of a relatively small value, just sufficient to overcome the losses in machine 123.

A decrease in the speed of motor shaft 113 below that of constant-speed-shaft 112 causes the differential mechanism to rotate the potentiometer-adjusting shaft 133 in such direction as to move the contact 131 upwardly, thereby decreasing the voltage impressed on the circuit of the machine 123 and the winding 124, thus causing the current in this circuit to materially decrease, or even reverse, under the action of machine 123, now driven as a generator by fly-wheel 127. The effect of this change of current is such as to assist the main-control winding 117 in allowing control-contact element 121 to move downwardly to energize the speed-adjusting motor 115 in the speed-raising direction, thereby quickening the response of the regulator.

At the time when the speed of the motor shaft 113 has been arrested in its downward variation and caused to again pick up to approach the value desired, the speed of machine 123 has sufficiently decelerated to cause the current through control winding 124 to again assume its original direction, and this change raises the force exerted on the control-element member, causing it to again move upwardly, and deenergize the speed-adjusting motor 115 before the speed of the motor 110 has been brought completely back to its desired value.

A consideration of the system of Fig. 6 will show that when the speed of the regulated motor rises above that of the constant-speed shaft, the functioning of the anti-hunting device is comparable to that which has been explained in connection with the speed-lowering corrective operations, the action tending to accelerate the response of the control device when the speed varies from the desired value and tends to retard the corrective action when the speed approaches the desired value.

As regards speed regulation, it will be apparent that this invention is capable of particularly broad usefulness in installations in which quick response is essential and where hunting must be avoided at all costs, as, for instance, in paper-machine drives, rolling mills and a number of other applications in which a plurality of motors must be maintained at an exact predetermined speed.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a regulating system, in combination, a direct-current circuit, means for controlling the voltage of said circuit, regulating means for actuating said controlling means, means for impressing upon said regulating means a fundamental control force that is substantially proportional to variations in said circuit voltage from its desired value, and means for modifying the effect of said fundamental control force in a manner to quicken the response of the regulating means and prevent overshooting of regulating action, said means comprising a transformer having a primary winding and a secondary winding, said secondary winding being connected to energize said regulating means in addition to said fundamental force, and a source of constant unidirectional potential connected in opposition with said circuit through said primary winding of the transformer.

2. In a regulating system for maintaining the voltage of a direct-current circuit at a desired value, voltage-adjusting means for said circuit, motive means for operating said adjusting means, a regulator element for controlling said motive means and having a main-control winding energized in accordance with the voltage of said circuit and an auxiliary-control winding disposed to act jointly therewith, a transformer having a primary winding and a secondary winding, said secondary winding being connected to said auxiliary-control winding, a source of constant unidirectional potential connected in opposition to said circuit through the primary winding of said transformer, said auxiliary-control winding being disposed to aid the main control winding of said regulator element when the circuit voltage starts to vary away from its desired value and to oppose the main winding of said regulator element as the circuit voltage again approaches its desired value, to thereby accelerate the regulator action and to prevent overshooting, respectively, of the said corrective action.

3. The combination with a direct-current circuit having voltage-adjusting means associated therewith, of a regulator comprising an element for controlling the actuation of said adjusting means, means for influencing said regulator element by a main control force which is directly proportional to variations in the voltage of said circuit, and a transformer having a primary winding acted upon by the voltage of the direct-current circuit and a secondary winding connected with the regulator element, said secondary winding being disposed to impress upon said regulator element a voltage producing an auxiliary control force, which aids the main control force when the direct-current circuit voltage deviates away from the desired value and which opposes the main control force when the direct-current voltage approaches the desired value.

EUGEN GÖRK.